United States Patent [19]

Sides et al.

[11] Patent Number: 5,712,754

[45] Date of Patent: Jan. 27, 1998

[54] HOT PLUG PROTECTION SYSTEM

[75] Inventors: Chi Kim Sides, Spring; Philip James McKenzie; Barry S. Basile, both of Houston, all of Tex.

[73] Assignee: Compaq Computer Corporation, Houston, Tex.

[21] Appl. No.: 631,963

[22] Filed: Apr. 15, 1996

[51] Int. Cl.⁶ .................................................. H02H 9/00
[52] U.S. Cl. ................................................ 361/58; 361/18
[58] Field of Search ............................. 361/58, 54, 55, 361/56, 57, 18, 88, 92, 94, 93, 100; 323/908

[56] References Cited

U.S. PATENT DOCUMENTS 5,572,395  11/1996  Rasums et al. .................. 361/58

*Primary Examiner*—Jeffrey A. Gaffin
*Assistant Examiner*—Sally C. Medley
*Attorney, Agent, or Firm*—Jenkens & Gilchrist

[57] ABSTRACT

A protection circuit for a computer system having PCI expansion cards and PCI expansion slots with multiple power rails for supplying power to the PCI expansion cards, the protection circuit including a current monitor that monitors the current levels drawn by the PCI expansion card at each power rail; an inrush current controller for controlling the initial current applied to each of the power rails when an expansion card is initially inserted into an expansion slot; a voltage monitor that monitors the voltage levels applied to selected power rails; and a disconnector for disconnecting the power to the PCI expansion slot when either the current level drawn by the PCI expansion card at any of the power rails goes beyond a selected range or when the voltage levels at any of the selected monitored power rails are below a selected threshold or when commanded by the computer system.

17 Claims, 3 Drawing Sheets

5,712,754

HOT PLUG PROTECTION SYSTEM

FIELD OF THE INVENTION

The present invention relates to protection circuits for computer systems having peripheral expansion slots. More specifically, the present invention relates to a protection circuit for a computer system having a peripheral component interconnect slot that receives peripheral component interconnect cards.

BACKGROUND OF THE INVENTION

Many existing computer systems utilize peripheral component interconnect (PCI) expansion slots and cards. The PCI utilizes power rails to transfer power from the computer system through the expansion slot to the card. Generally +5V, +3.3V, +12V and −12V power rails are used.

In computer systems utilizing a PCI environment, expansion cards can be plugged into the computer system while the computer system is powered and running. As can be appreciated, the ability to hot plug PCI cards is especially desirable in network computer systems. This allows maintenance to be performed on a server in a network computer system without having to power down the server. For example the addition of a PCI expansion card or the removal and replacement an existing defective PCI expansion card can be performed while the server of the network computer system is running thereby allowing users to continue to use the system during the maintenance period.

However, if the added PCI expansion card is defective or if a problem arises with the PCI expansion card such as if an effective short is caused by the card's bypass capacitors between its power rails and ground, then when the card is hot plugged into the network computer system, a system failure could result. Further if an installed PCI expansion card becomes defective during use, a system failure could also result.

Therefore it is desirable to be able to monitor the current drawn by the PCI expansion card at each of the power rails and if at any time the current drawn at any of these power rails is beyond a selected range, it is also desirable to be able to quickly turn off the power to the PCI expansion slot or to the PCI expansion card so that the entire computer system does not fail.

SUMMARY OF THE INVENTION

The present invention overcomes the above identified problems as well as other shortcomings and deficiencies of existing technologies by providing a PCI hot plug protection circuit that monitors the current drawn at each of the power rails of the PCI expansion slot and that shuts off power to the expansion slot when the current drawn at any of the power rails go beyond a selected range.

The present invention further provides a computer system having: PCI expansion cards; PCI expansion slots with four power rails to supply power to the PCI expansion cards; a current monitor that monitors the current levels drawn by the PCI expansion card at each power rail; an inrush current controller for controlling the initial current applied to each of the power rails when power is initially applied to an expansion card; a voltage monitor that monitors the voltage levels applied to selected power rails; and a disconnector for disconnecting the power to the PCI expansion slot when either the current level drawn by the PCI expansion card at any of the power rails goes beyond a selected range or when the voltage levels at any of the selected monitored power rails do not reach or fall below a selected operating potential.

BRIEF DESCRIPTION OF THE DRAWINGS

A more complete understanding of the method and apparatus of the present invention may be had by reference to the following Detailed Description and appended claims when taken in conjunction with the accompanying Drawings wherein:

DETAILED DESCRIPTION

Figure 1:
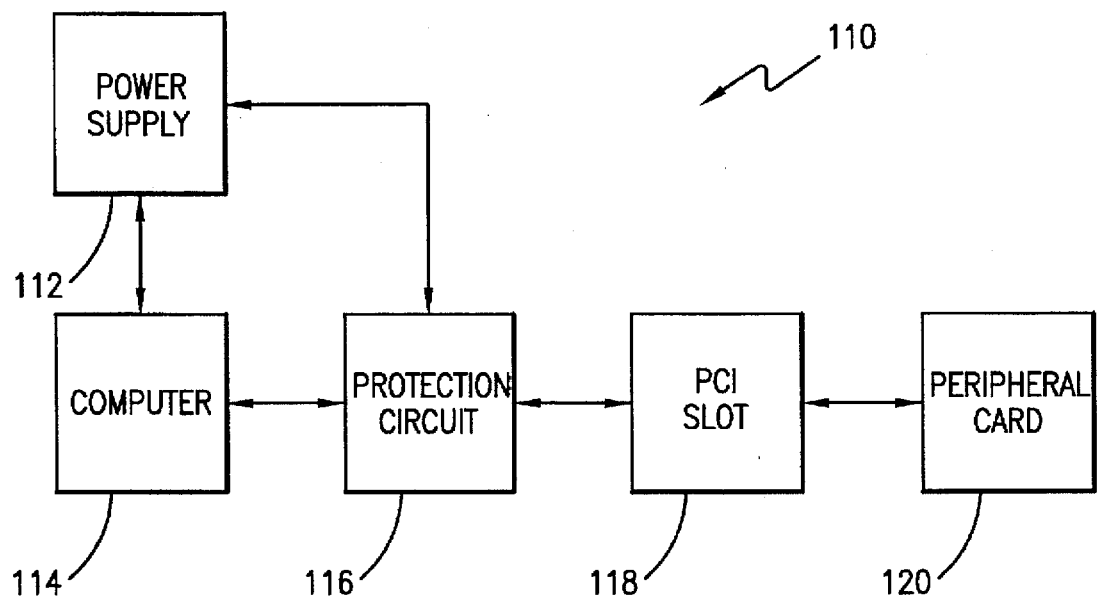
FIG. 1 is a block diagram illustrating a computer system utilizing the present invention.

Referring now to FIG. 1, there is shown a block diagram illustrating a computer system 110 utilizing the present invention therein. As depicted the computer system 110 includes a power supply 112, a computer 114, a protection circuit 116, a peripheral component interconnect (hereinafter "PCI") slot 118 and a peripheral card 120.

Computer 114 is interconnected between protection circuit 116 and power supply 112. Power supply 112 provides at least a portion of the power to the operate computer system 110. PCI slot 118 is connected to protection circuit 116 and is configured to receive a PCI expansion card such as peripheral card 120.

PCI slot 118 is a standard PCI slot and includes a +5V, +3.3V, +12V and −12V power rails for supplying power to peripheral card when connected therein.

It is contemplated that the present invention is not limited to a single protection circuit, PCI slot, and peripheral card, but rather could be practiced by one skilled in the art to include multiple protection circuits, multiple PCI slots, and multiple peripheral cards all within the computer system.

Figure 2:
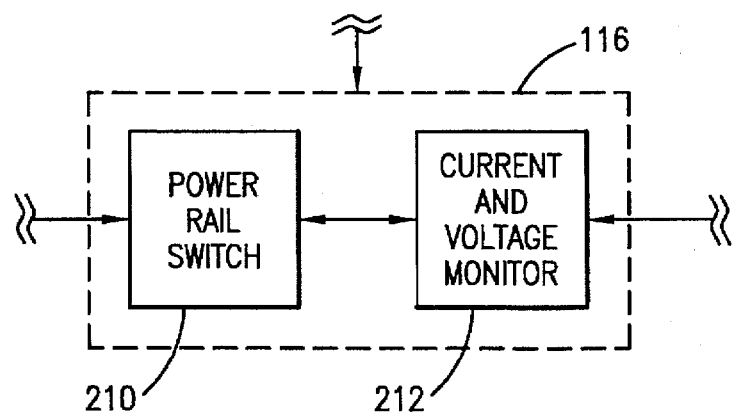
FIG. 2 is a more detailed block diagram illustrating the protection circuit shown in FIG. 1.

Referring now to FIG. 2, there is shown a block diagram illustrating in more detail protection circuit 116 as shown in FIG. 1. As depicted protection circuit 116 includes a power rail switch 210 connected with an overcurrent detector 212.

In general operation, protection circuit 116 allows a peripheral card to be connected to PCI slot 118 while the computer system is powered and running and prevents the computer system from failing if the added peripheral card is defective such as by having an effective short therein. The overcurrent detector 212 of protection circuit 116 monitors currents and voltages being supplied to the peripheral card 120 when it is connected to PCI slot 118. When any of the monitored currents are beyond a selected value or if any of the monitored voltages are below a selected value, monitor 212 generates a fault signal which is used to interrupt the CPU of the computer system 110, and also generates and sends disconnect signal to power rail switch 210 whereby power rail switch 210 disconnects the power to PCI slot 118.

Power rail switch 210 also controls the in-rush current, i.e. the initial current that is supplied to the peripheral card 120 when it is initially connected to PCI slot 118. The in-rush current is limited during power up so that overcurrent detector 212 does not trip. A more detailed description of power rail switch 210 and overcurrent detector 212 and their operations are given below with reference to FIGS. 3 and 4 respectively.

Figure 3:
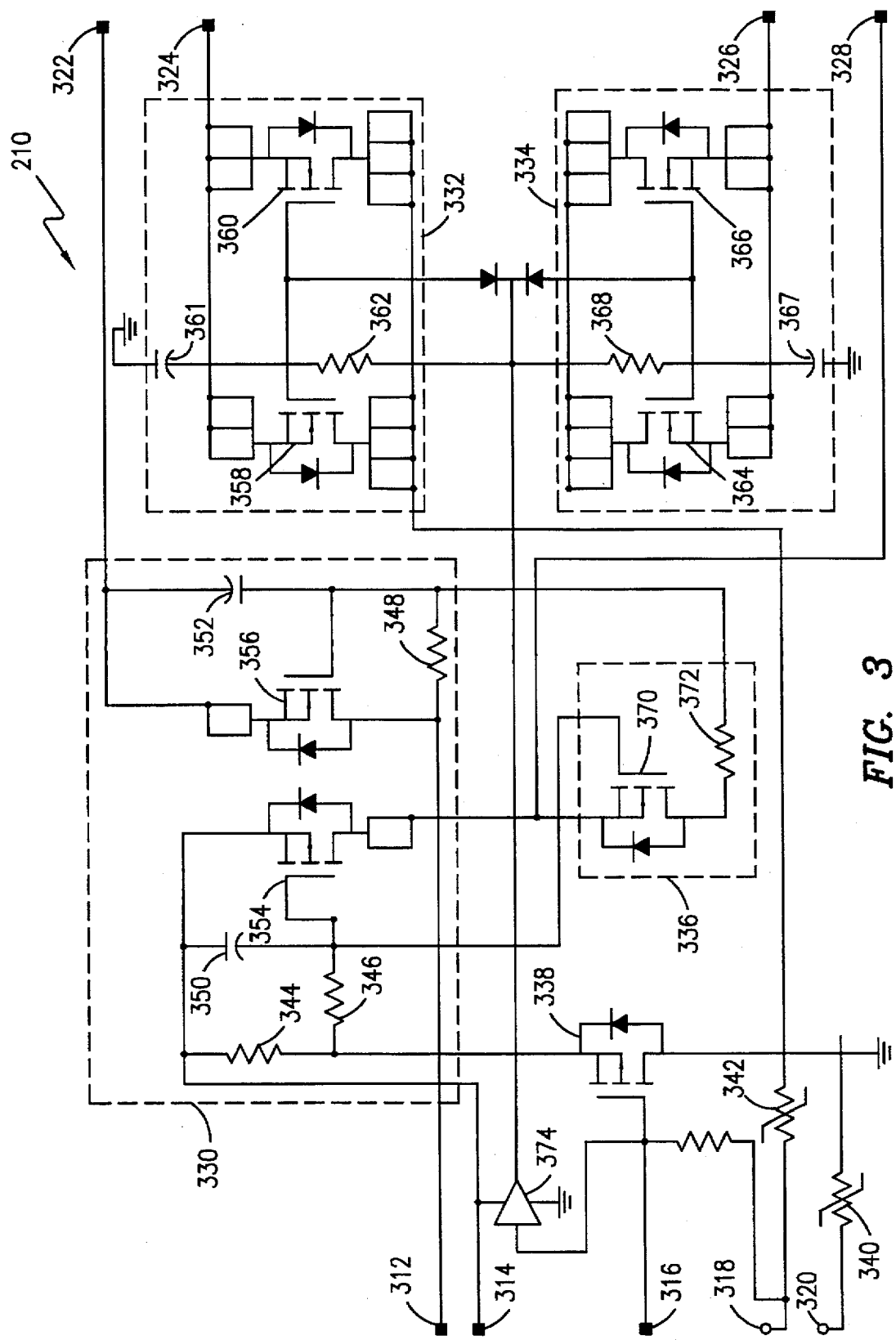
FIG. 3 is schematic diagram illustrating the in-rush current controller shown in FIG. 2.

Referring now to FIG. 3, there is illustrated a schematic diagram of power rail switch 210 shown in FIG. 2. As depicted power rail switch 210 includes input terminals 312, 314, 316, 318 and 320, with terminals 312, 314, 318 and 320 receiving power signals from power supply 112. Power rail switch 210 further includes output terminals 322, 324, 326 and 328, controllers 330, 332 and 334 for controlling the outputs to the output terminals, and a level shifter 336.

In this particular embodiment, input terminal 312 receives a −12V signal, input terminal 314 receives a +12V signal, input terminal 318 receives a +5V signal, and input terminal 320 receives a +3.3V signal, while input terminal 316 receives a power on signal.

Output terminal 322 is a −12V output terminal, output terminal 324 is a +5V output terminal, output terminal 326 is a +3.3V output terminal, and output terminal 328 is a +12V output terminal.

Controller 330 controls the output signals to output terminals 322 and 328, while controller 332 controls the output signal to output terminal 324 and controller 334 controls the output to output terminal 326.

Power rail switch 210 further includes FET 338, and positive temperature coefficient (PTC) resistors 340 and 342. PTC resisters 340 and 342 are used as secondary overcurrent protectors by abruptly increasing in resistance when a select overcurrent condition is detected. This is preferred to be higher than required to trip overcurrent detector 212. This is because, if a PTC resistor is tripped, it takes several hours for its resistance to return to its initial value.

Controller 330 includes resisters 344, 346 and 348, capacitors 350 and 352, and FETs 354 and 356. Controller 332 includes FETs 358 and 360, capacitor 361, and resistor 362. Controller 334 includes FETs 364 and 366, capacitor 367 and resistor 368. Level shifter 336 includes FET 370 and resistor 372.

In operation, when power is first applied to power rail switch, the power on signal received at input terminal 316 is high. This enhances the channel of FET 338 bringing the signal low with respect to ground. The low signal pulls down on the gate of p-channel FET 354, whereby capacitor 350 and resisters 344 and 346 slowly lower the voltage received from input terminal 314 thereby slowly ramping the gate voltage of FET 354, thereby slowing turning on FET 354. This controls the amount of inrush current associated with the power rail supplying the +12V to input terminal 314. After FET 354 has been turned on, the voltage signal sent from controller 330 to output terminal 328 will reach a +12V signal.

Similarly and simultaneously within controller 330, capacitor 352 and resistor 348 slowly ramp the gate voltage of FET 356, thereby slowing turning on FET 356. This controls the amount of in-rush-current associated with the power rail supplying the −12V to input terminal 312. After FET 356 has been turned on, the voltage signal sent from controller 330 to output terminal 322 will reach a −12V signal.

Controllers 332 and 334 also operate in a similar manner. When a high power-enable signal is received at input terminal 316, the signal is passed high through non-inverting buffer 374 to each of controllers 332 and 334. Within controller 332, capacitor 361 and resistor 362 slowly ramp the gate voltages of FETs 358 and 360, thereby slowly turning on FETs 358 and 360. This controls the amount of in-rush current associated with the power rail supplying the +5V to input terminal 318. After FETs 358 and 360 have been turned on, the voltage signal from controller 332 to output terminal 324 will reach a +5V signal.

Within controller 334, capacitor 367 and resistor 368 slowly ramp the gate voltages of FETS 364 and 366, thereby slowly turning on FETs 364 and 366. This controls the amount of in-rush current associated with the power rail supplying the +3.3V to input terminal 320. After FETs 364 and 366 have been turned on, the voltage signal from controller 344 to output terminal 326 will reach a +3.3V signal.

When the power is to be disconnected, the power on signal received at 316 is low turning off FET 338, which then turns off controllers 330, 332 and 334, thereby preventing power from reaching output terminals 322, 424, 326 and 328. It is noted that controllers 332 and 334 are disconnected quickly because of the diodes associated therewith.

Figure 4:
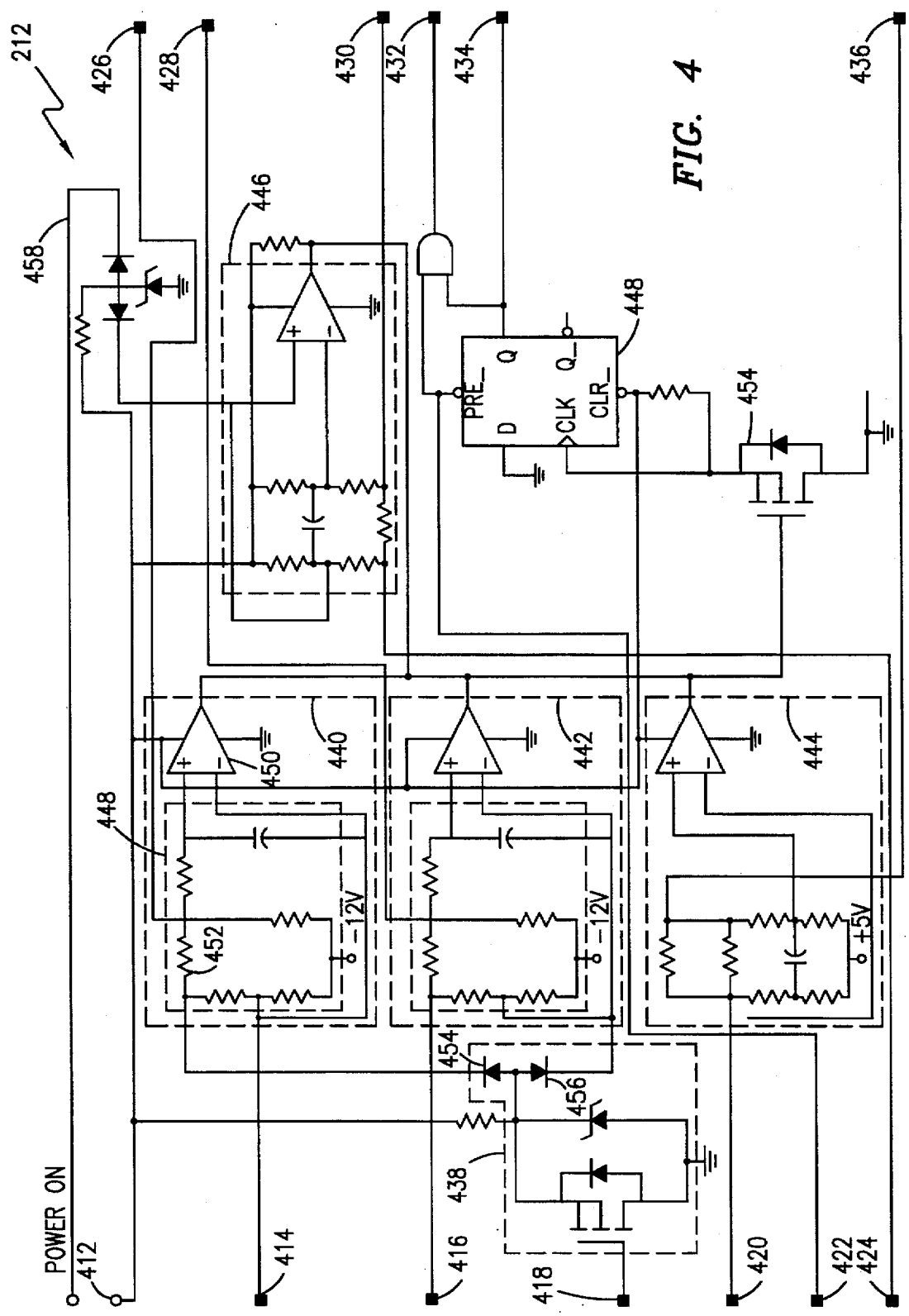
FIG. 4 is a schematic diagram illustrating the current and voltage monitor shown in FIG. 2.

Referring now to FIG. 4, there is illustrated a schematic diagram of overcurrent detector 212 shown in FIG. 2. As depicted detector 212 includes input terminals 412, 414, 416, 418, 420, 422 and 424, with input terminals 414, 416, 420 and 424 being connected to output terminals 326, 324, 328 and 322 of power rail switch 210, respectively. Input terminal 412 is connected to power supply to receive +12V signal, input terminal 418 is coupled to receive a bus enable signal, the bus enable signal being high when the slot has reached a stable operating state, and input terminal 422 is coupled to receive a power enable signal, the power enable signal being high when power is to be supplied to the slot.

Overcurrent detector 212 further includes output terminals 426, 428, 430, 432, 434 and 436, with output terminals 426, 428, 430 and 436 being connected to peripheral card 120 and supplying thereto +3.3V, +5V, −12V and +12V signals respectively.

Overcurrent detector 212 further includes voltage level detectors 440, 442, 444 and 446, an under voltage detector 438, and a flip-flop 448. Voltage level detectors 440 442, 444 and 446 are coupled to monitor the input signals received at input terminals 414, 416, 420 and 424 respectively and to monitor output signals at output terminals 426, 428, 436 and 430 respectively. The under voltage detector 438 is coupled to operate with voltage level detectors 440 and 442.

The voltage level detectors 440, 442, 444 and 446 monitor the current drawn by each of the power rails and when an overcurrent is detected at any of the voltage level detectors, i.e. when the current passing through any of the voltage level detectors goes beyond a selected level, flip-flop 448 will be enabled and generate a low power-on signal at output terminal 432 (which is connected to input terminal 316 of power rail switch 210). Power rail switch 210 will then disconnect power from slot 118 by turning off controllers 330, 332 and 334 (see FIG. 3).

Voltage level detector 440 includes a voltage divider 448 and a comparator 450. An overcurrent condition is detected by using comparator 450 to monitor the voltage drop across resistor 452 of voltage divider 448. When the voltage drop across resistor 452 is sufficient to bring the negative input of comparator 450 above the positive input of comparator 450 by a user defined amount of voltage an overcurrent condition exists. When this occurs the output of comparator 450 is pulled low, FET 454 is turned off, triggering flip-flop 448 to latch and to send a low power-on signal out of output terminal 432, wherein power rail switch 210 will disconnect power from slot 118 by turning off controllers 330, 332 and 334.

A fault indicator is also sent to the CPU from output terminal 434. Voltage level detectors 442, 444 and 446 generally operate in a similar manner as voltage level detector 440.

Although good results have been achieved with the above described voltage level detector, it is contemplated that other voltage level detectors could be utilized in the present invention by one skilled in the art.

Good results have also been achieved in the exemplary embodiment by setting the overcurrent trip point to greater than 9 A for the both the +5V and the +3.3V power rails, greater then 1.5 A for the +12V power rail, and greater than 300 mA for the −12V power rail. However it is contemplated that other trips could be utilized in the present invention.

The under voltage detector 438 detects power failure on the +5V and the +3.3V power rails. In operation, input terminal 418 receives a bus enable signal, a high signal to enable the under voltage detector 438 and a low signal to disable the under voltage detector 438. In this exemplary embodiment, under voltage detector 438 is disabled during initial power-up so that under voltage detector 438 does not trip overcurrent detector. When the power to the slot has been stabilized, the bus enable signal goes high, enabling under voltage detector 438.

If the voltage at either of the +3.3V or the +5V power rails drop below a user selected level, the corresponding diode (diode 454 or 456) will pull the signal at the negative input of the comparator in the corresponding voltage level detectors (440 or 442) high enough to pull the output of the comparators low. FET 454 is then turned off, triggering flip-flop 448 to latch and to send a low power-on signal out of output terminal 432. A fault indicator is also sent into the CPU in the computer from output terminal 434, wherein power rail switch 210 will disconnect power from slot 118 by turning off controllers 330, 332 and 334.

A fault indicator is also sent to the CPU from output terminal 434. Voltage level detectors 442, 444 and 446 generally operate in a similar manner as voltage level detector 440.

It is noted that bias circuitry 458 prevents false overcurrent indications when power-on is initially set high.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A computer system having a power supply and at least one interface card, said computer system comprising:

at least one interface card-receiving socket for removably receiving the interface card thereat, the power supply selectively connectable to the interface card when the interface card is received at said at least one interface card-receiving socket and the power supply for supplying voltage and current to the interface card;

a current monitor for monitoring the current levels of the current drawn by the interface card when the interface card is received at said at least one interface card-receiving socket; and a power rail switch coupled to receive indications of the current levels monitored by said current monitor, said power rail switch for disconnecting the power supply from the interface card when the indications of the current levels monitored by said current monitor are beyond a selected level;

wherein said power rail switch comprises a plurality of controllers and at least one level shifter.

2. The computer system as recited in claim 1, wherein:

said at least one interface card-receiving socket receives the interface card while said computer system receives power from said power supply.

3. The computer system as recited in claim 2, and further comprising:

a current controller for controlling the level of current supplied to the interface card for a select amount of time subsequent to said at least one interface card-receiving socket receiving the interface card.

4. The computer system as recited in claim 2, wherein:

said at least one interface card-receiving socket includes a power interface integrated therein, said power interface for transferring power from the power supply to the interface card when the interface card is received at said at least one interface card-receiving socket; and said power interface includes a plurality of power rails wherein the power supply supplies a voltage at each of said plurality of power rails.

5. The computer system as recited in claim 4, and further comprising:

a voltage monitor for monitoring the voltage potential levels of said voltage potential supplied to at least one of said plurality of power rails.

6. The computer system as recited in claim 5, wherein:

said power rail switch is further coupled to receive indications of a potential level monitored by said voltage monitor, said power rail switch further for disconnecting the power supply from the interface card when the indications of said potential level monitored by said voltage monitor are below a selected level.

7. The computer system as recited in claim wherein:

said power supply supplies voltage potentials of approximately +12, −12, +5, and +3.3 volts to a first, a second, a third and a fourth power rail of said plurality of power rails, respectively.

8. A protection circuit for a computer having at least one peripheral component interconnect (PCI) slot for removably receiving an interface card and a power supply selectively connectable to the interface card when the interface card is received at the PCI slot, the power supply for supplying voltage and current to the interface card, said protection circuit comprising:

a current monitor for monitoring the current levels of the current drawn by the interface card when the interface card is received at the PCI slot; and a power rail switch coupled to receive indications of the current levels monitored by said current monitor, said power rail switch for disconnecting the power supply from the interface card when the indications of the current levels monitored by said current monitor are beyond a selected level;

wherein said power rail switch comprises a plurality of controllers and at least one level shifter.

9. The protection circuit as recited in claim 8, and further comprising:

a current controller for controlling the level of current supplied to the interface card for a selected amount of time subsequent to the at least one PCI slot receiving the interface card.

10. The protection circuit as recited in claim 8, and further comprising:

a power interface for transferring power from the power supply to the interface card when the interface card is received at the PCI slot, said power interface includes a plurality of power rails wherein the power supply supplies a voltage at each of said plurality of power rails.

11. The protection circuit as recited in claim 10, and further comprising:

a voltage monitor for monitoring the voltage potential level of the voltage supplied to at least one of said plurality of power rails.

12. The protection circuit as recited in claim 11, wherein:

said power rail switch is further coupled to receive indications of a potential level monitored by said voltage monitor, said power rail switch further for disconnecting the power supply from the interface card when the indications of said potential level monitored by said voltage monitor is below a selected level.

13. The protection circuit as recited in claim 8, wherein:

said current monitor includes at least one voltage divider and at least one comparator.

14. A computer system having a power supply and at least one interface card, said computer system comprising:

at least one interface card-receiving socket for removably receiving the interface card thereat, the power supply selectively connectable to the interface card when the interface card is received at said at least one interface card-receiving socket and the power supply for supplying voltage and current to the interface card;

said at least one interface card-receiving socket receives the interface card while said computer system receives power from said power supply;

a current controller for controlling the level of current supplied to the interface card for a selected mount of time subsequent to said at least one interface card-receiving socket receiving the interface card;

a current monitor for monitoring the current levels of the current drawn by the interface card when the interface card is received at said least one interface, card-receiving socket; and a power rail switch coupled to receive indications of the current levels monitored by said current monitor, said power rail switch for disconnecting the power supply from the interface card when the indications of the current levels monitored by said current monitor are beyond a selected level;

wherein said power rail switch comprises a plurality of controllers and at least one level shifter.

15. The computer system as recited in claim 14, wherein:

said at least one interface card-receiving socket includes a power interface integrated therein, said power interface for transferring power from the power supply to the interface card when the interface card is received at said at least one interface card-receiving socket; and said power interface includes a plurality of power rails wherein the power supply supplies a voltage at each of said plurality of power rails.

16. The computer system as recited in claim 15, and further comprising:

a voltage monitor for monitoring the voltage potential levels of said voltage potential supplied to at least one of said plurality of power rails.

17. The computer system as recited in claim 16, wherein:

said power rail switch is further coupled to receive indications of a potential level monitored by said voltage monitor, said power rail switch further for disconnecting the power supply from the interface card when the indications of said potential level monitored by said voltage monitor are below a selected level.

* * * * *

UNITED STATES PATENT AND TRADEMARK OFFICE
CERTIFICATE OF CORRECTION

PATENT NO.   : 5,712,754
DATED        : Jan. 27, 1998
INVENTOR(S)  : Sides et al.

It is certified that error appears in the above-identified patent and that said Letters Patent is hereby corrected as shown below:

| | |
|---|---|
| Column 3, line 22 | Replace "resisters" With --resistors-- |
| Column 3, line 29 | Replace "resisters" With --resistors-- |
| Column 3, line 40 | Replace "resisters" With --resistors-- |
| Column 3, line 44 | Replace "inrush" With --in-rush-- |
| Column 5, line 7 | Replace "9 A" With --9A-- |
| Column 5, line 8 | Replace "1.5 A" With --1.5A-- |
| Column 7, line 32 | Replace "mount" With --amount-- |

Signed and Sealed this

Nineteenth Day of January, 1999

Attest:

Attesting Officer

*Acting Commissioner of Patents and Trademarks*